(12) United States Patent
Boulanger et al.

(10) Patent No.: US 6,431,314 B1
(45) Date of Patent: Aug. 13, 2002

(54) MOBILE SCAFFOLD VEHICLE

(75) Inventors: Sylvain Boulanger, Pickering; Jeffrey Richard Lyon; Greg Peter Hubbard, both of Whitby, all of (CA)

(73) Assignee: Scaffway Inc., Solina (CA)

( * ) Notice: Subject to any disclaimer, the term of this patent is extended or adjusted under 35 U.S.C. 154(b) by 0 days.

(21) Appl. No.: 09/633,823

(22) Filed: Aug. 7, 2000

Related U.S. Application Data

(60) Provisional application No. 60/148,385, filed on Aug. 12, 1999.

(51) Int. Cl.[7] .............................. E04C 1/00; E04G 3/16; B60K 1/00
(52) U.S. Cl. .......................... 182/63.1; 182/16; 182/13; 180/65.1
(58) Field of Search .............................. 182/12, 13, 14, 182/15, 16, 63.1, 119, 178.1, 127, 144; 180/65.1

(56) References Cited

U.S. PATENT DOCUMENTS

| | | | | |
|---|---|---|---|---|
| 3,614,993 A | * | 10/1971 | Penso | 182/16 |
| RE28,455 E | * | 7/1975 | Denier et al. | 182/16 |
| 3,930,548 A | * | 1/1976 | Wallraff | 182/13 X |
| 3,961,681 A | * | 6/1976 | Fisher | 182/16 X |
| 4,053,025 A | * | 10/1977 | Slusarenko | 182/16 X |
| 4,088,202 A | * | 5/1978 | Costello | 182/13 |
| 4,275,797 A | * | 6/1981 | Johnson | 182/16 X |
| 4,294,332 A | | 10/1981 | Ready | |
| 4,475,611 A | * | 10/1984 | Fisher | 182/13 X |
| 4,967,733 A | * | 11/1990 | Rousseau | 182/13 |
| 5,211,259 A | * | 5/1993 | Kishi | 182/63.1 X |
| 6,039,148 A | * | 3/2000 | Riegel | 182/16 |
| 6,050,365 A | * | 4/2000 | Newlin | 182/14 X |

* cited by examiner

*Primary Examiner*—Daniel P. Stodola
*Assistant Examiner*—Hugh B. Thompson
(74) *Attorney, Agent, or Firm*—James E. Gastle

(57) ABSTRACT

The mobile scaffold vehicle has a motorized base with an upper surface and a first frame member and a second member. The first and second fame members are pivotally mounted near respective opposite ends of the upper surface. The first frame member is movable independently of the second frame member from an inoperative storage position near the upper surface and a generally vertical operative position. The second frame member is movable independently of the first frame member from an inoperative storage position near the upper surface and a generally vertical operative position, so that in their operative positions, the first and second fame members are generally paralel with one another and located near opposite ends of the upper surface. A platform is attachable with the frame members in the operative position and a plurality of anchor arrangements for anchoring the frame members in the operative position, thereby to permit a operator to stand on the platform.

19 Claims, 14 Drawing Sheets

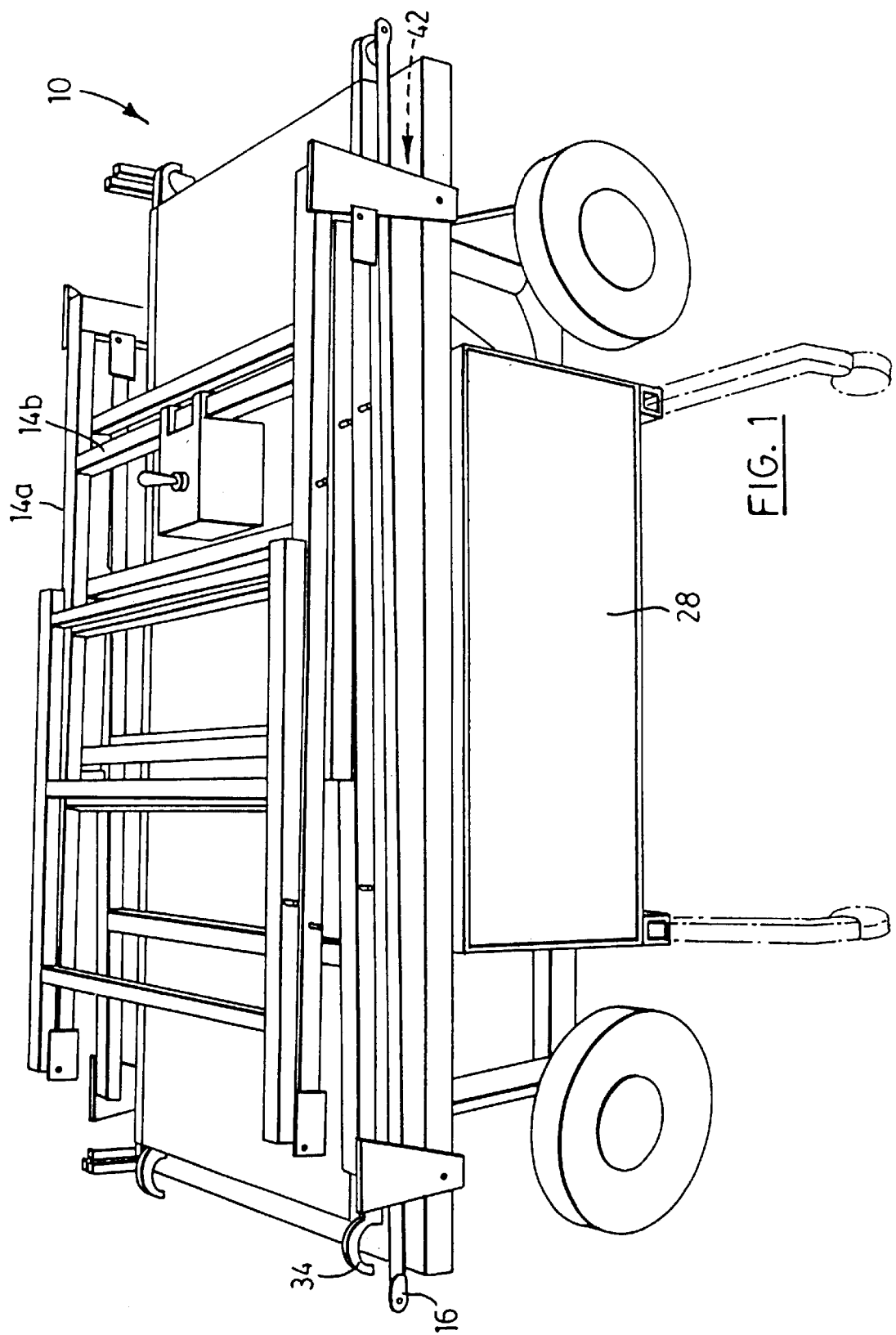

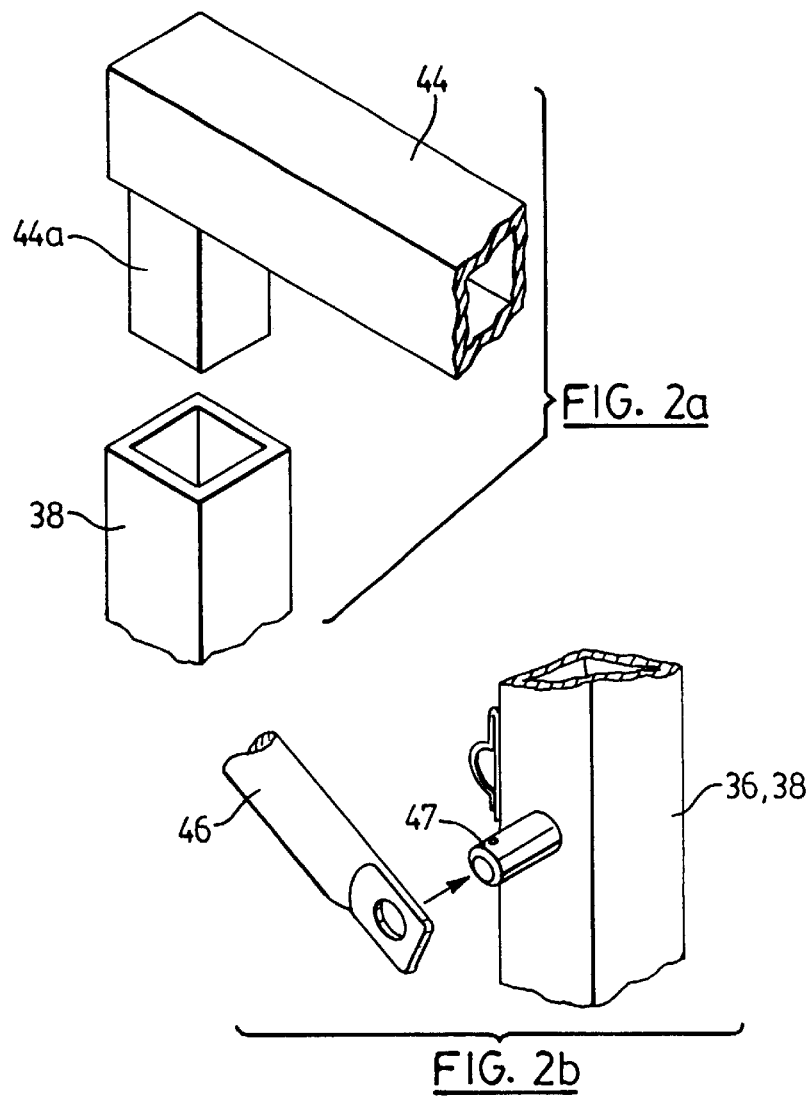
FIG. 2a
FIG. 2b
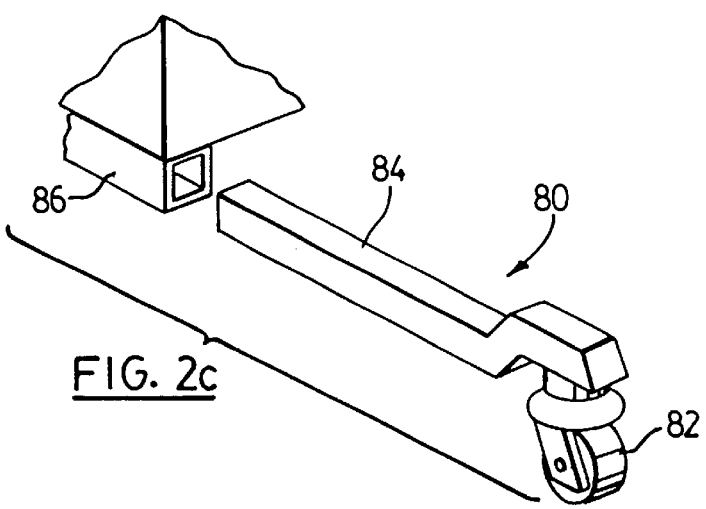
FIG. 2c

BATTERY CONNECTION
AND SUPPLY TO CONTROL
PANEL

12 VDC CONTROLS
24 VDC MOTORS

MOBILE SCAFFOLD VEHICLE

REFERENCE TO CO-PENDING APPLICATION

The subject matter of U.S. provisional application serial No. 60/148,385 filed Aug. 12, 1999 and entitled MOBILE SCAFFOLD VEHICLE is incorporated herein by reference.

BACKGROUND OF THE INVENTION

1. Field of the Invention

The present invention relates to the scaffolding.

2. Description of the Related Art

Scaffolding is widely used as a modular platform to work at high elevations on construction sites, particularly those involving the finishing of the interiors of residential and commercial buildings. Scaffolding is usually a structure having four stationary posts, which may include pads to distribute the weight over a relatively larger floor area. Alternatively, the posts are provided with casters for limited movement of the scaffold over floor surfaces. In the latter case, such movement necessitates that all personnel climb off the scaffold before it is moved, causing significant delays and inconvenience. In this era of time-based job estimating, it would be desirable to have a scaffold which can be moved safely while the personnel can remain on the scaffold.

It is therefore an object of the present invention to provide a novel scaffold vehicle.

It is a further object of the present invention to provide a motorized scaffold vehicle having improved maneuverability and control.

SUMMARY OF THE INVENTION

Briefly stated, the present invention involves a mobile scaffold vehicle, comprising at least two frame members pivotally mounted to a motorized base, said base having an upper surface, said frame members movable between an inoperative inclined position adjacent said upper surface and an upright operative position, a platform attachable with said frame members in said operative positions and a plurality of anchor arrangements for anchoring said frame members in said operative position.

In another of its aspects, the present invention provides a method of handling scaffolding comprising:

providing a motorized base with an upper surface;

pivotally mounting at least two frame members to said upper surface;

arranging said frame members for movement between an inoperative inclined position adjacent said upper surface and an upright operative position;

securing said frame members in said operative position; and positioning a platform on said frame members in said operative positions.

In yet another aspect of the present invention, there is provided a mobile scaffold vehicle, comprising a motorized base having an upper surface, at least two frame members movable relative to said base between an inoperative position and an upright operative position, a platform attachable with said frame members in said operative positions and a plurality of anchor arrangements for anchoring said frame members in said operative position.

In still another aspect of the present invention, there is provided a mobile scaffold vehicle, comprising a motorized base means having an upper surface, at least two frame member means movable relative to said base between an inoperative position and an upright operative position, a platform means attachable with said frame members in said operative positions and means for anchoring said frame members in said operative position.

In yet another aspect of the present invention, there is provided a method of handling scaffolding comprising:

a step for providing a motorized base with an upper surface;

a step for mounting at least two frame members relative to said upper surface for movement between an inoperative inclined position adjacent said upper surface and an upright operative position;

a step for securing said frame members in said operative position; and a step for positioning a platform on said frame members in said operative positions.

BRIEF DESCRIPTION OF THE DRAWINGS

Several preferred embodiments of the present invention will be provided, by way of example only, with reference to the appended drawings, wherein:

FIG. 1 is a perspective view of a scaffold vehicle in an inoperative position;

FIG. 2-1 is a side view of the vehicle of FIG. 1 in an intermediate position;

FIG. 2—2 is a side view of the vehicle of FIG. 1 in an operative position;

FIG. 2a is a fragmentary perspective view according to arrow 2a of FIG. 2—2;

FIG. 2b is a fragmentary perspective view according to arrow 2b of FIG. 2—2;

FIG. 2c is a fragmentary perspective view according to arrow 2c of FIG. 2—2;

FIG. 5c is a fragmentary perspective view of a portion of the vehicle illustrated in FIG. 5a;

DESCRIPTION OF THE PREFERRED EMBODIMENTS

Figures 1, 2:
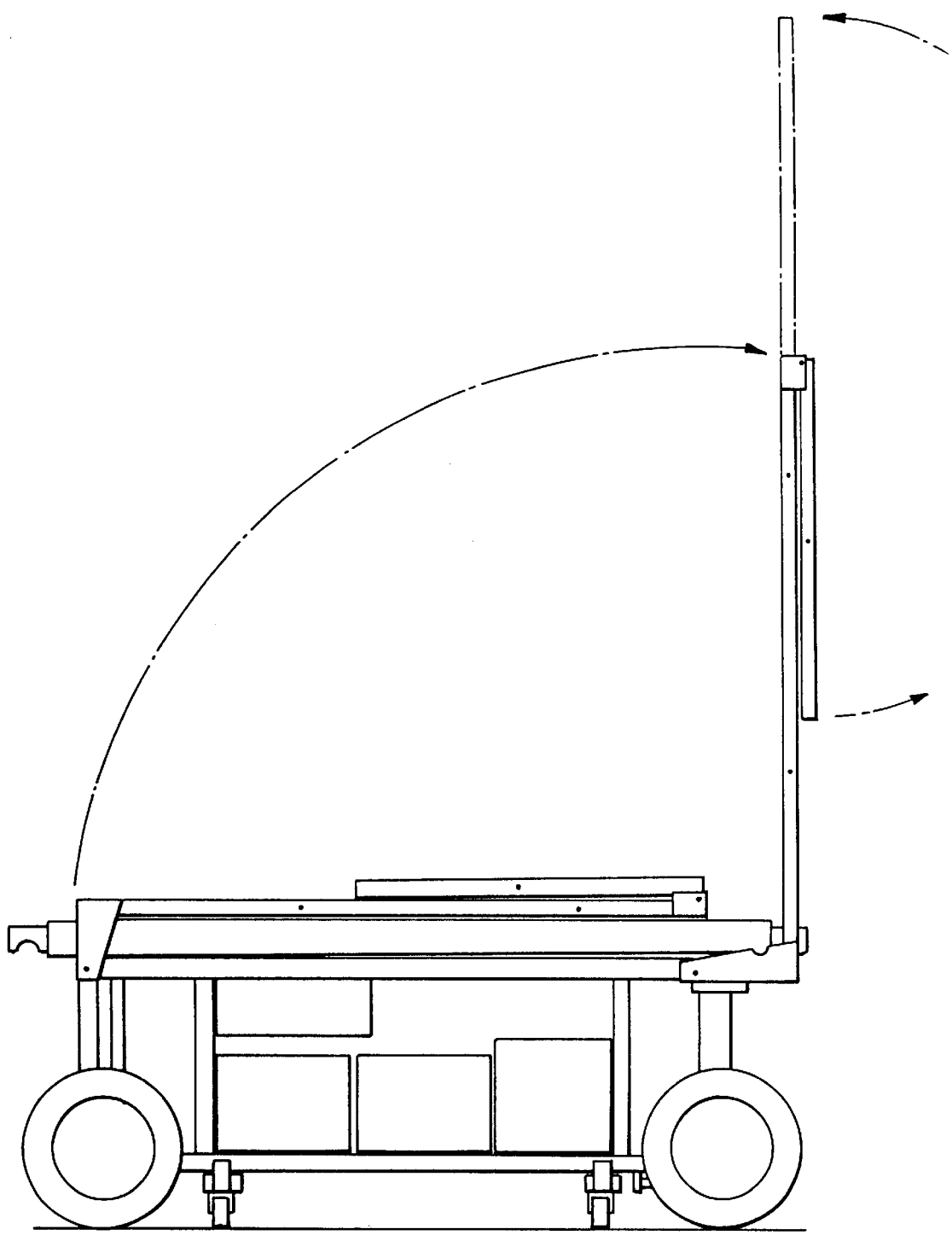
Figure 2:
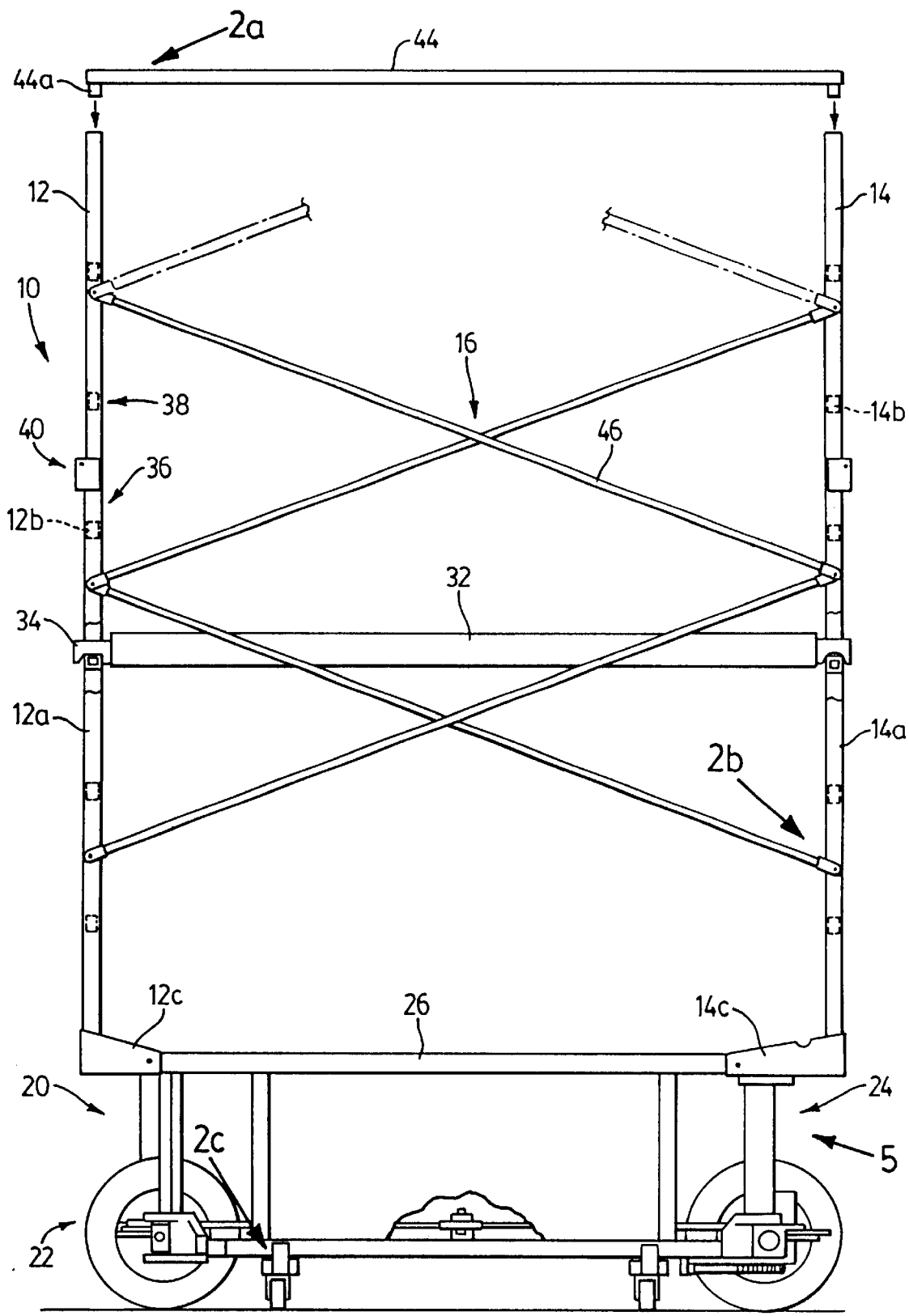

Referring to the figures, particularly FIG. 2—2, there is provided a mobile scaffold vehicle 10 comprising a frame including a pair of end frame assemblies 12, 14, a pair of side frame assemblies 16 and an undercarriage 20 to support the end frame assemblies. The undercarriage 20 includes a wheel assembly 22 and a motor unit 24 (see FIG. 5) for delivering power to the wheel assembly.

Figure 5A:
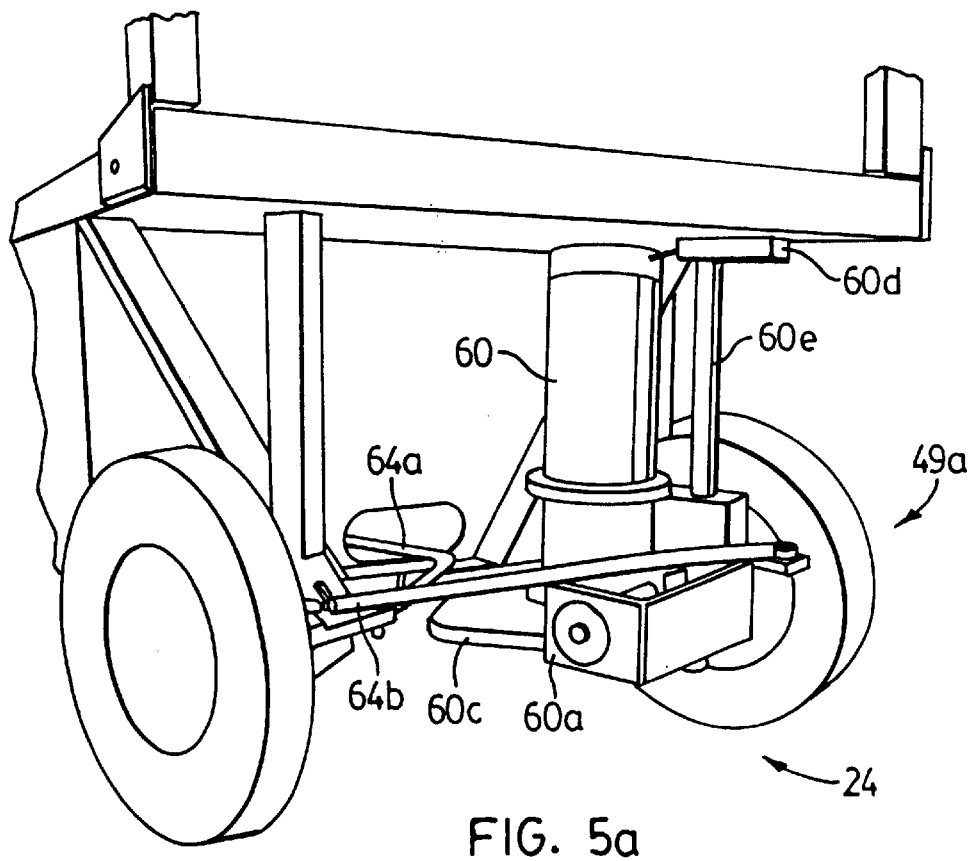
FIGS. 5a and 5b are fragmentary perspective views of opposite end regions of the vehicle of FIG. 1.
Figure 5B:
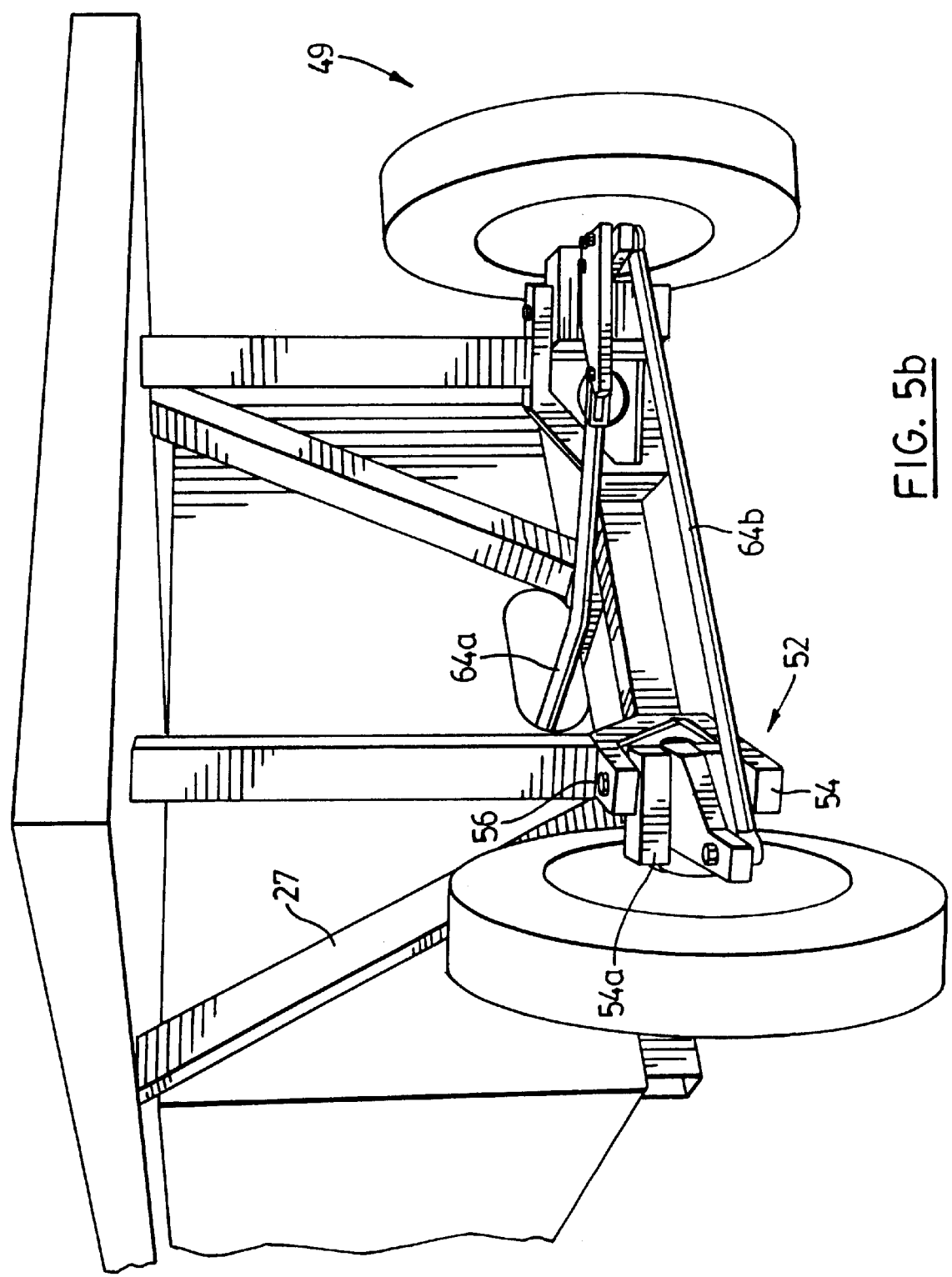

The undercarriage 20 also includes a base 26. As will be described, each of the end frame assemblies 12, 14 is pivotally connected with the base 26, for movement between a storage position, as shown in FIG. 1, and an upright operative position, as shown in FIG. 2—2. The base 26 includes a chassis (as shown in FIGS. 5a, 5b), formed by a number of structural members, one shown at 27, to provide a mounting location for a number of outer panel members, one shown at 28 in FIG. 1, and providing an inner cavity for a steering linkage, a number of batteries and control circuitry as will be described.

Referring to FIGS. 1 and 2—2, each of the end frame assemblies 12, 14 has a pair of uprights 12a, 14a with at least one lateral member 12b, 14b extending there between for supporting a platform 32. The lateral members 12b are positioned so as to be at equal elevation to the other lateral members 14b, so that the platform can be at any one of a number of elevations depending on the job at hand. The platform has a pair of hook members 34 on each end thereof allowing the platform to rest atop a given pair of lateral members 12b, 14b.

Each of the end frame assembles has a lower portion 36 which is pivotally attached to an upper portion 38 about a hinge assembly 40. Pivot flanges 12c, 14c are also fixed to the lower end of the respective uprights 12a, 14a and is pivotally connected to the base 26. As seen in FIG. 1, the pivot flanges 14c are slightly longer than the pivot flanges 12c, so that, in the storage position, the end frame assembly 14 is offset vertically relative to the end frame assembly 12, to allow for their nesting. Furthermore, the pivot flanges are of sufficient length to form a passageway 42 between the end frame assembly 12 and the undercarriage in order to store therein the platform 32 and the side frame assemblies 16.

In the operative position, the upper end of the end frame assemblies are joined by a pair of struts 44, each having a pair of end portions 44a to engage an inner passage in the corresponding upper portion 38 as shown in FIG. 2b. Each of the side frame assemblies 16 includes a pair of scissored struts 46, whose ends are each provided with a passage to receive an anchor pin 47 to anchor each strut to a corresponding portion of the end frame assembly, as shown in FIG. 2a. Thus, the frame assemblies 12, 14, the struts 44 and the side frame assemblies form a work space above the platform, shown generally at 49.

Figure 5C:
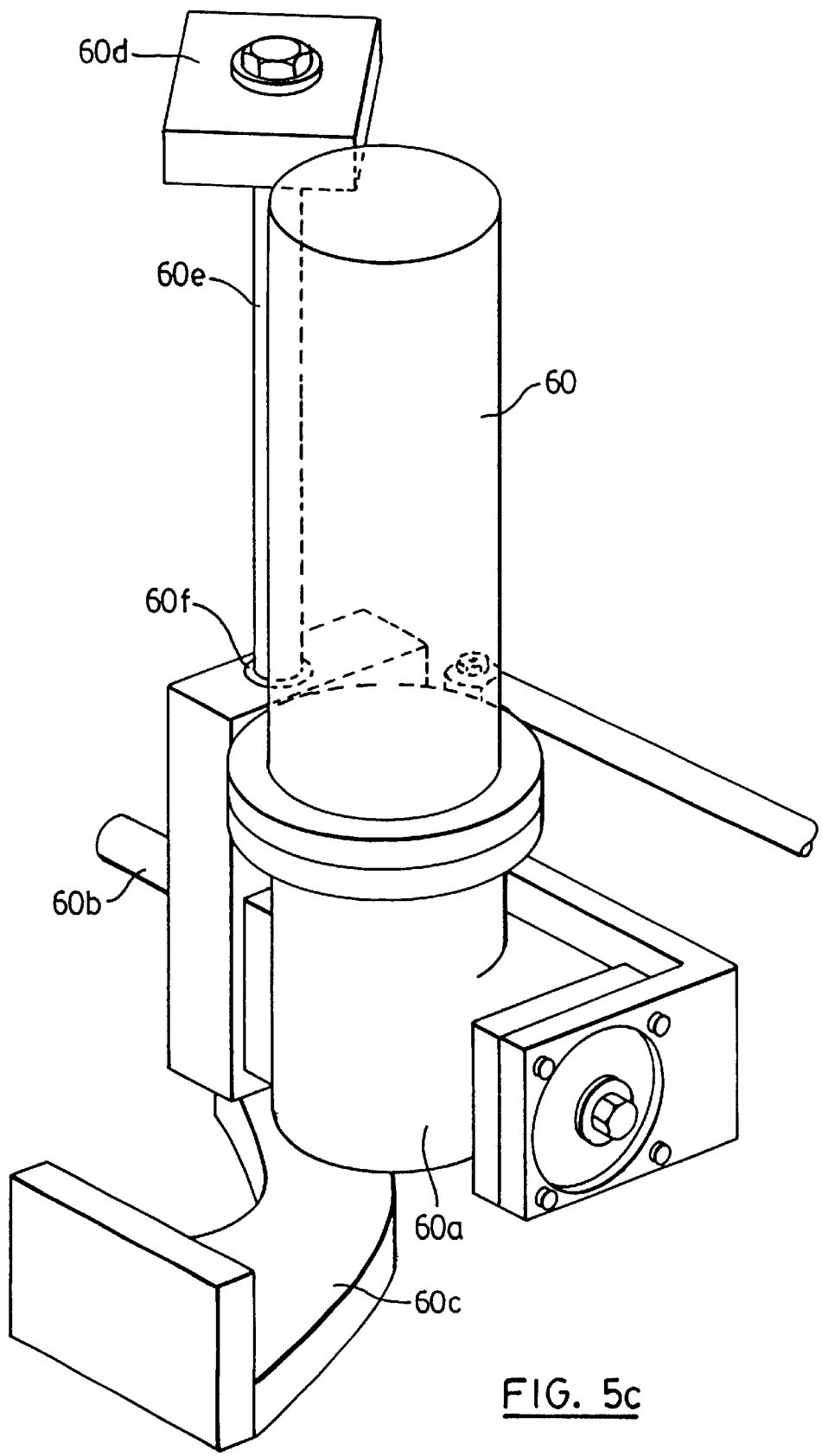

Referring to FIGS. 5a and 5b, the wheel assembly 22 includes a plurality of wheels 49, one of which is a driving wheel 49a to receive power from the motor unit 24. The wheel assembly also includes a suspension arrangement 52 for mounting each of the wheels for rotation about a corresponding steering axis. The suspension arrangement includes a pair of frame members 54 extending outwardly from the base 26 with a gap therebetween to receive a wheel hub support 54a. The frame members 54 have coaxial passages to receive a swivel pin 56, itself extending through the wheel hub support 54a. Referring to FIGS. 5a and 5c, the motor unit preferably includes a motor 60, for example an electric, hydraulic or pneumatic motor, which is mounted on a transmission unit 60a which in turn has a output drive 60b to be fixed to the drive wheel 49a. The transmission unit is pivotally mounted between a lower support flange 60c extending outwardly from the vehicle chassis and an upper support block 60d which is fixed to the upper region of the chassis. Both the upper and lower support blocks have coaxial passages to receive a pivot shaft 60e, itself extending through a passage 60f in the transmission unit 60a.

Figure 3:
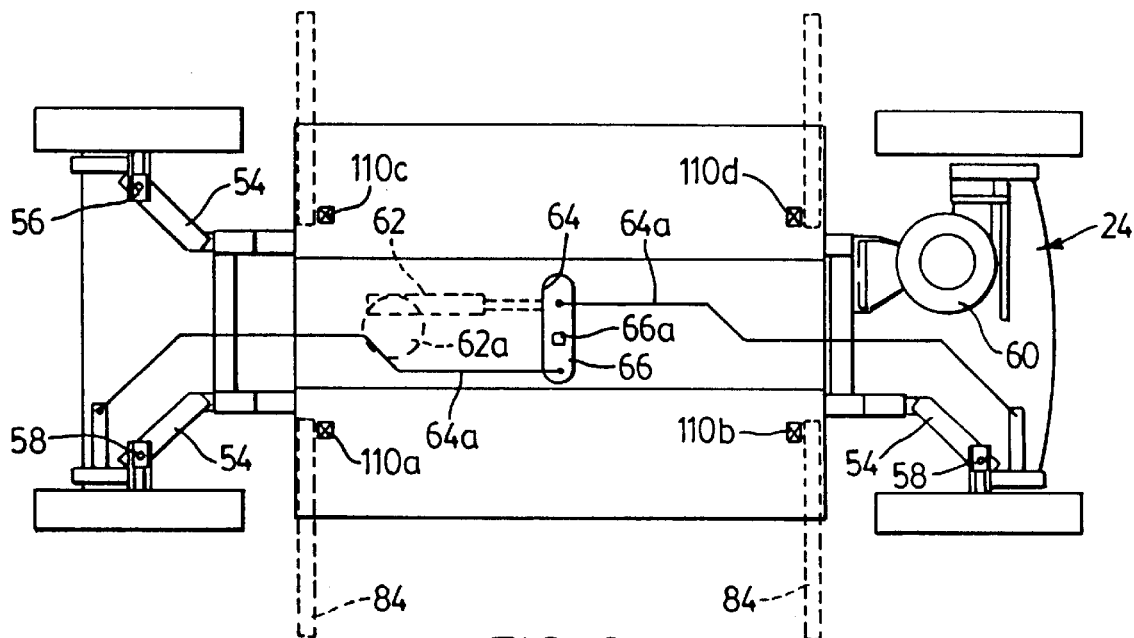
FIGS. 3 and 4 are schematic plan views of the vehicle in different orientations.
Figure 4:
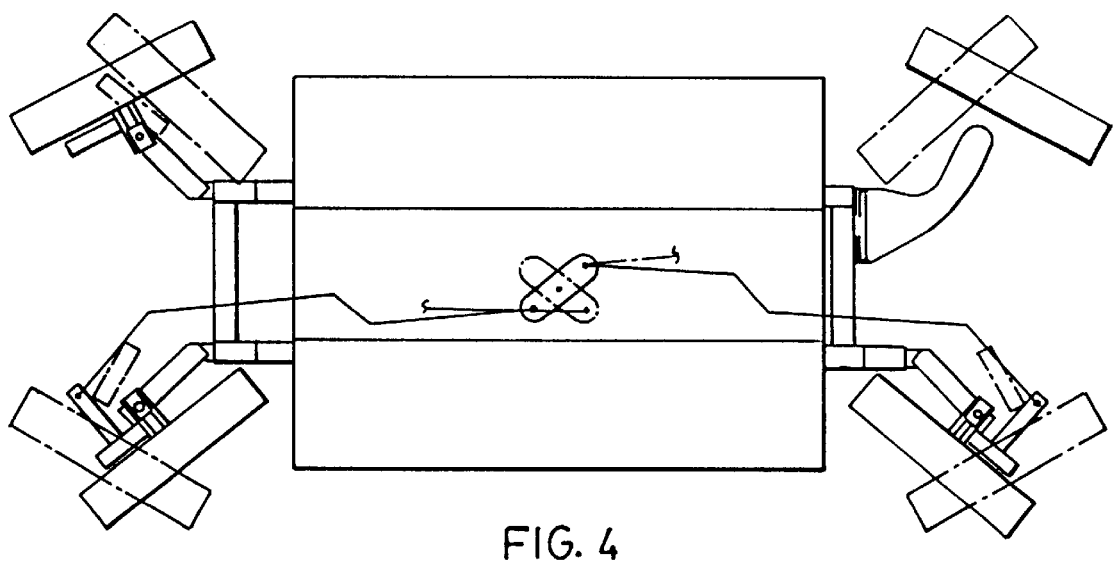

Referring to FIG. 3, the wheel assembly 20 also includes a linear actuator unit, for example electric, hydraulic or pneumatic, shown schematically at 62 and a steering linkage 64 joining the linear actuator unit with the wheels. Thus, the wheel assembly 20 allows for four-wheel steering. The linkage includes longitudinal spans 64a joining a selected wheel to a toggle 66, itself centrally pivoted at 66a and driven by the linear actuator 62.

Figure 6:
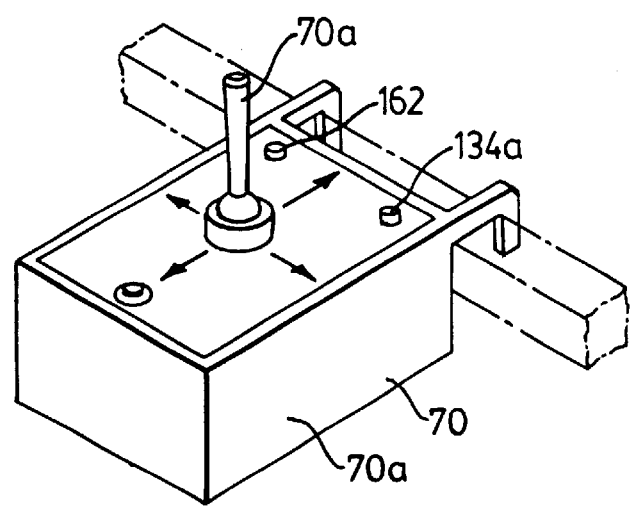
FIG. 6 is a fragmentary perspective view of yet another portion of the vehicle of FIG. 1.
Figure 7:
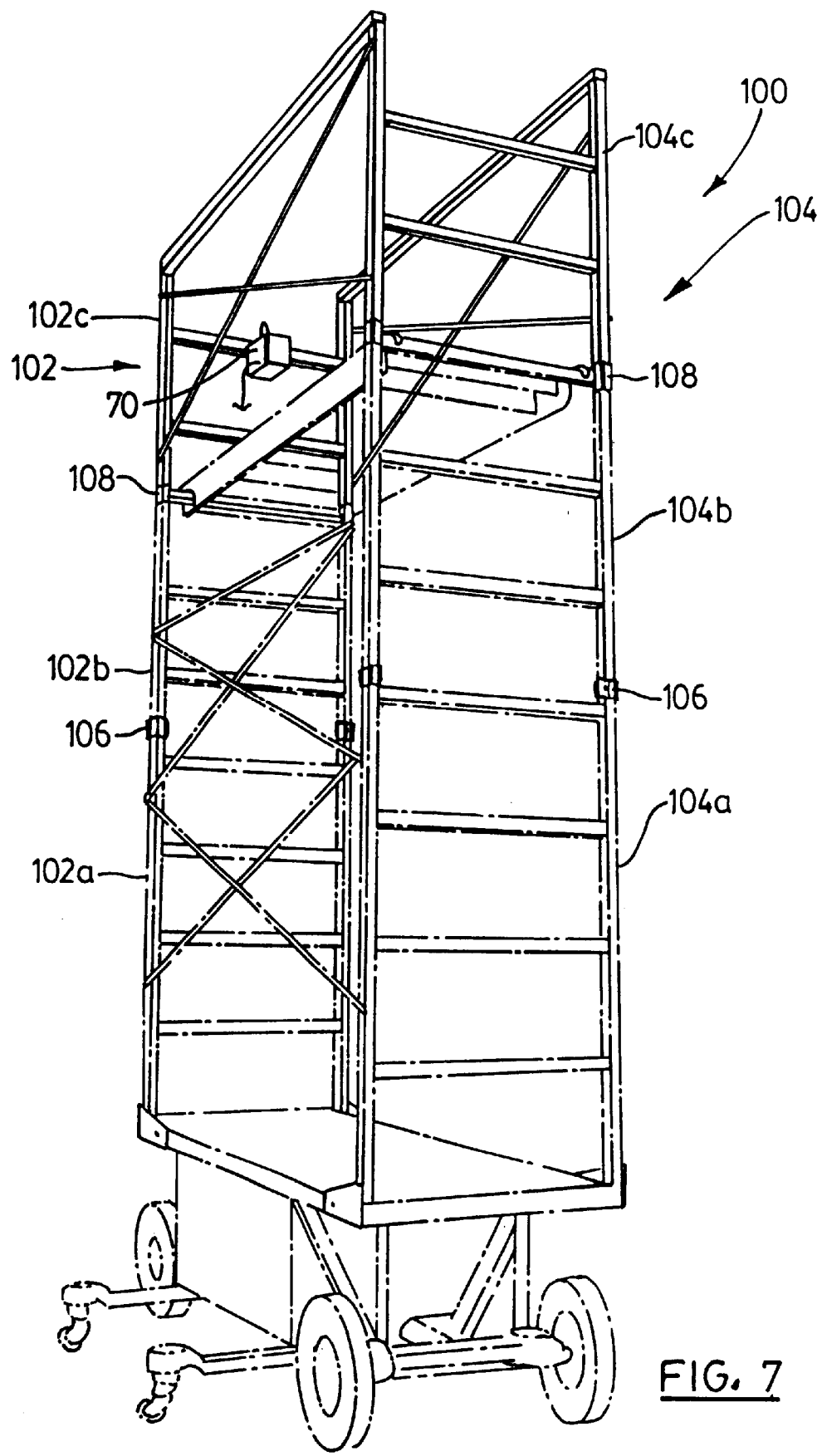
FIG. 7 is a fragmentary perspective view of another scaffold vehicle.

Referring to FIGS. 6 and 7, a controller unit 70 is provided to control the motor unit 24. The controller unit 70 has a portable housing 70a joined to the motor and steering mechanisms by a cord 72. A hook 74 or similar attachment is provided on the controller housing so that the controller unit can be hooked to a convenient location above the platform. In this manner, the controller unit can be positioned at one of a number of mounting locations on the frame assembly. Thus, the controller unit is of particular value because the user is capable of maneuvering the assembly while being on its working surface, as will be described.

Referring to FIG. 2c, the frame further includes a plurality (in this case four) of outrigger members 80 operable for laterally stabilizing the vehicle. Each outrigger member includes a caster wheel 82 positioned on a arm 84, the latter of which is slidably engaged in a corresponding sleeve 86 positioned on the lower portion of the chassis. There are, in this particular case, four sleeves 86 on the chassis to receive four outrigger members 80, although more or less outrigger members may be used, as deemed appropriate.

The vehicle 10 is compact, allowing for transport in a conventional panel truck, partly because the end frame assemblies are pivotally connected with the base, each between a storage position and an upright position. Furthermore, the end frame assemblies are arranged so as to nest with one another in the storage position.

To prepare the vehicle 10 for operation, it is first deployed from its storage position, which involves removing the struts 44, the platform 32 and the side frame assemblies 16 from atop the undercarriage. The end frame assemblies 12, 14 are then hinged upwardly from their nested horizontal position and the struts 44 are fastened with the upper portions 38. The side frame assemblies 16 are then coupled to the corresponding anchor pins and the platform 32 is then positioned on one pair of lateral support members, according to the height at which the user wishes to work. The user then hooks the controller unit at a convenient location within comfortable reach from the platform 32.

The user can then install the outrigger members in their corresponding sleeves to complete the assembly. It may be that, in some cases, the outrigger members need not be used, depending on the relative dimensions of the vehicle. For example, the wider the undercarriage, the greater stability it will have and therefore reduce the need for the outrigger members. Similarly, the higher the elevation of the platform, the greater the need for the outrigger members.

Figure 7A:
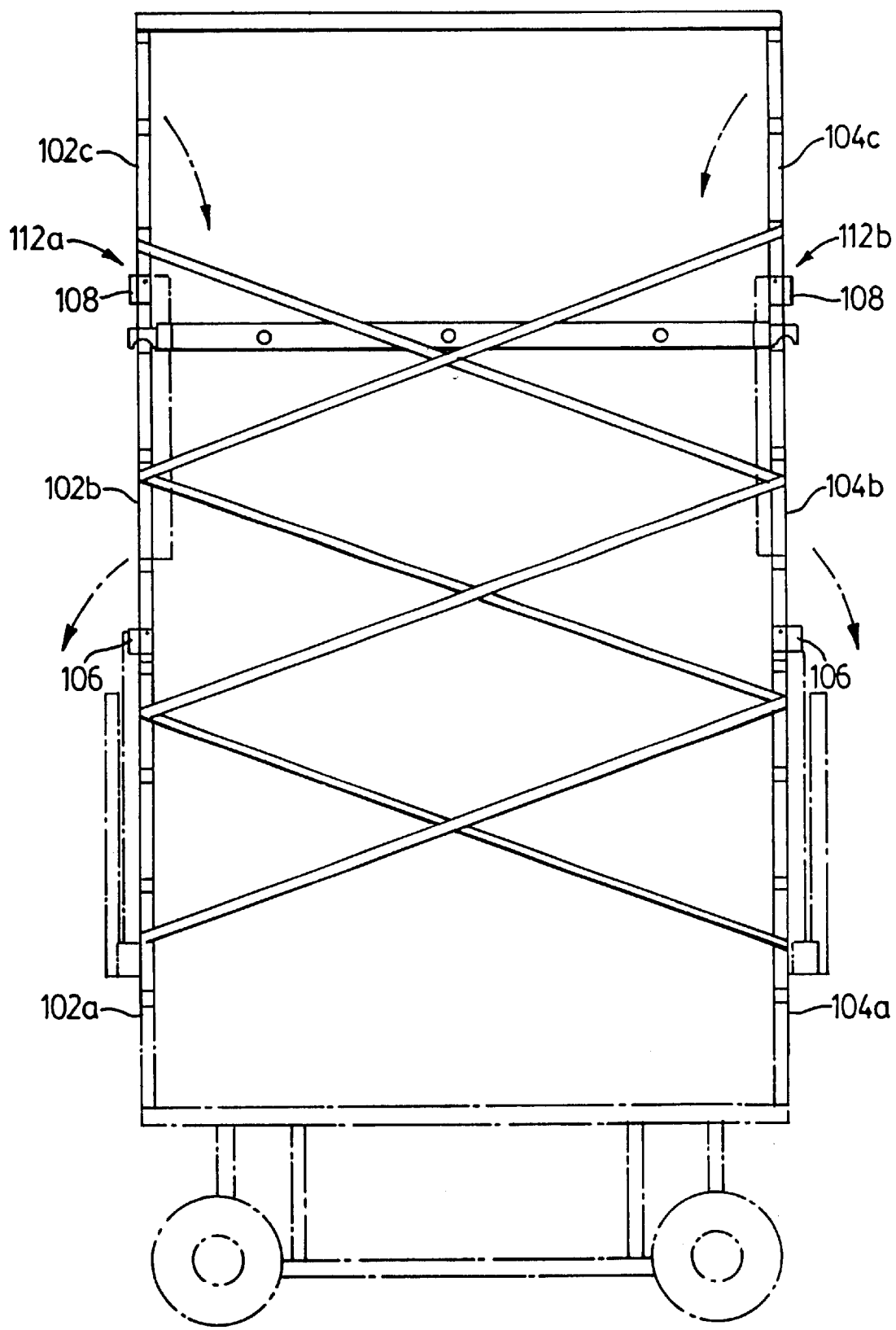
FIG. 7a is a side view of a the vehicle of FIG. 7.
Figure 9:
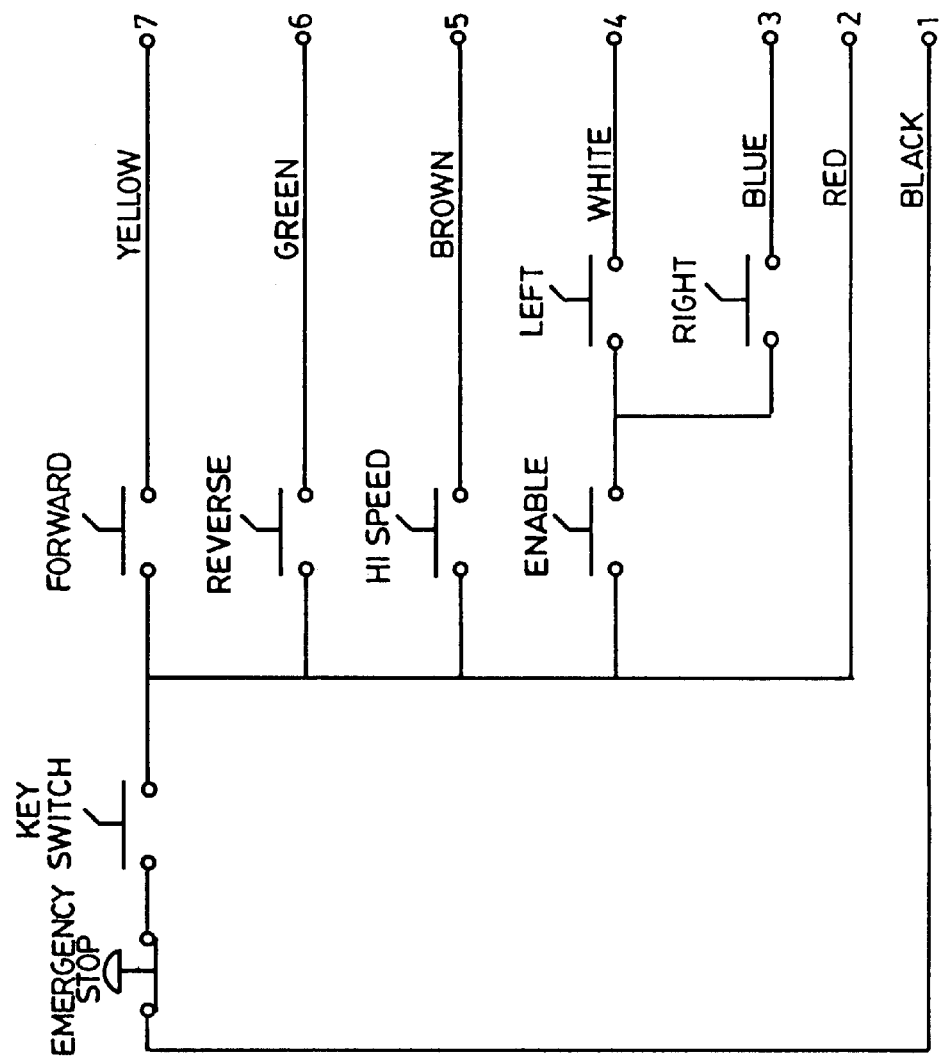
FIGS. 8 through 13 are schematic views of portions of the vehicle of FIG. 7.
Figure 8:
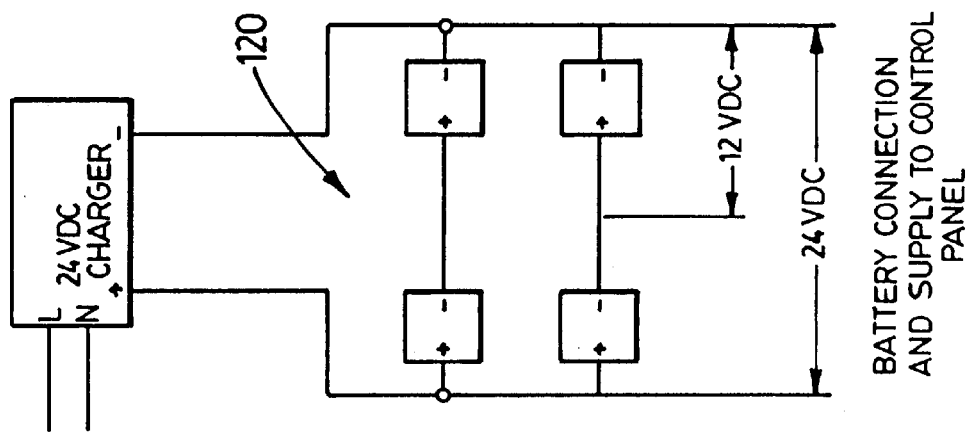

The scaffold vehicle is shown in another variation at 100 in FIGS. 7 and 7a, having a pair of frame assemblies 102, 104. Each has a lower portion 102a, 104a, an intermediate portion 102b, 104b and an upper portion 102c, 104c which are interconnected respectively by hinges 106, 108. In this case, the end frame assemblies are operable with the upper portions 102c, 104c between a first relatively low position as shown in dashed lines in FIG. 7a, and a second relatively high or upright position as shown in solid lines in FIG. 7.

The vehicle variation 100 is further provided with an interlock circuit to control the operation of the vehicle when the upper portions 102c, 104c are in their upright position and only when the outrigger members are in place. This is done to ensure that vehicle is not operated in a potentially unstable manner. The interlock circuit operates in a first phase to detect the position of the frame and in a second phase to disable the motor unit when the frame is in the second position without the outrigger members in their operative position.

The circuit includes a number of magnetic proximity switches to form, collectively, a closed circuit when the upper segments and the outrigger members are in their proper positions to ensure stable operation of the vehicle. As shown in FIG. 3, switches 110a–110d are located within the sleeves 86 and are arranged to close when the corresponding outrigger members are properly installed, thereby forming a first closed circuit. Two switches are located on each end frame assembly, as shown in FIG. 7a, at 112a, 112b, in order to close when the upper portions are in their folded-up position, thereby forming a second closed circuit. Also provided is a monitoring system to monitor the closed circuit conditions of the proximity switches and to control accordingly, the power from a power source, in this case a battery pack, to the motor and steering assembly. Should, for any reason, one of the two circuits be opened, as would occur if any one of the switches themselves is opened, the monitoring system detects the open position and blocks further power feed from the power source.

FIGS. 8 through 13 show the control circuitry associated with the controller in more detail. A battery pack 120 is joined to a forward-reverse motor 60 and a left-right motor 62a driving the linear actuator 62. The control of the forward-reverse motor is achieved by a motor drive card, available from IPC Automation, as shown at 122. The drive card has inputs shown at 122a, 122b and 122c which receive the 24 VDC supply from the battery pack 120 and inputs shown at 122d, 122e and 122f which provide for a control of the function of the forward-reverse motor 60, the latter being attached at the drive outputs 122g and 122h.

Figure 11:
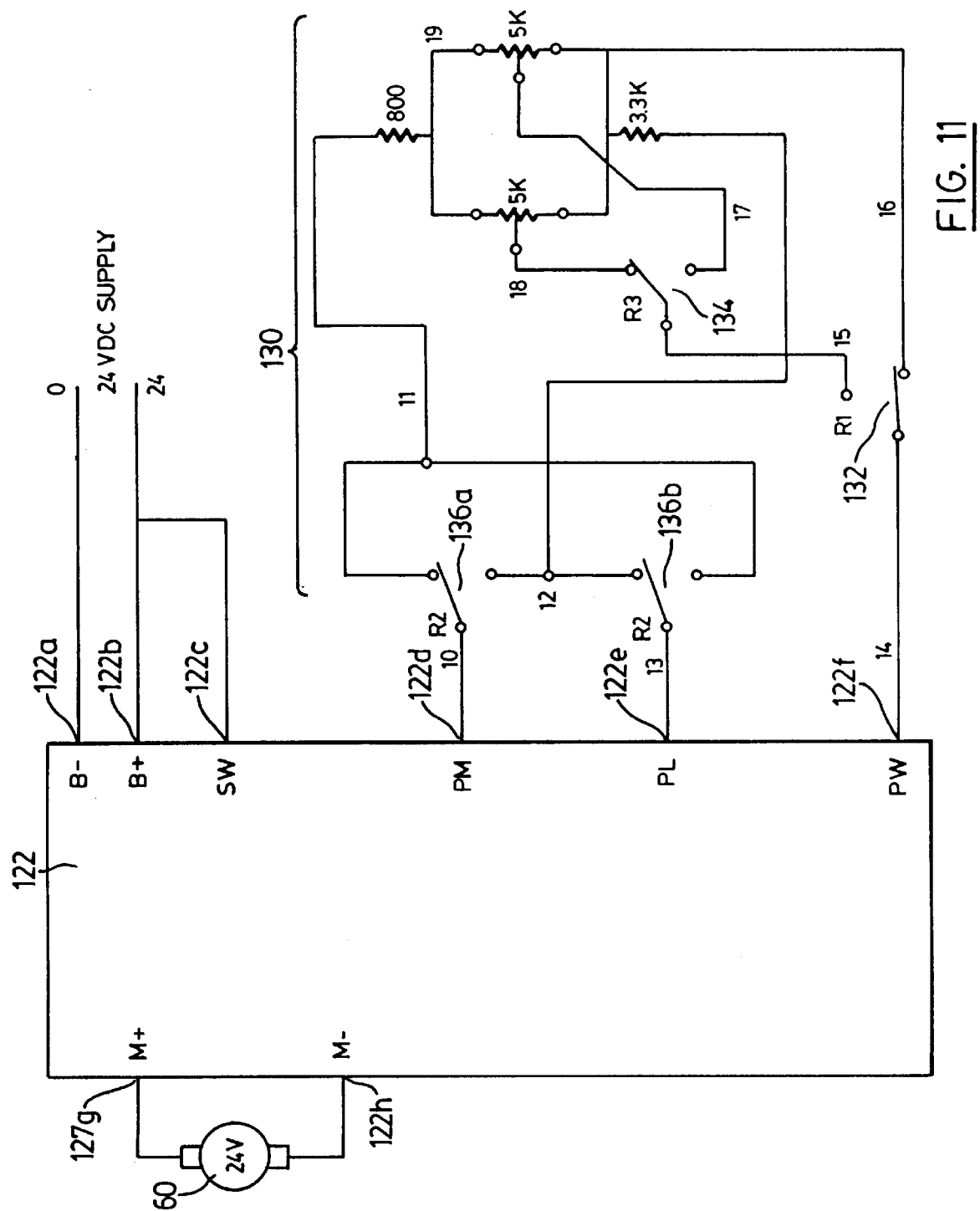
Figure 13:
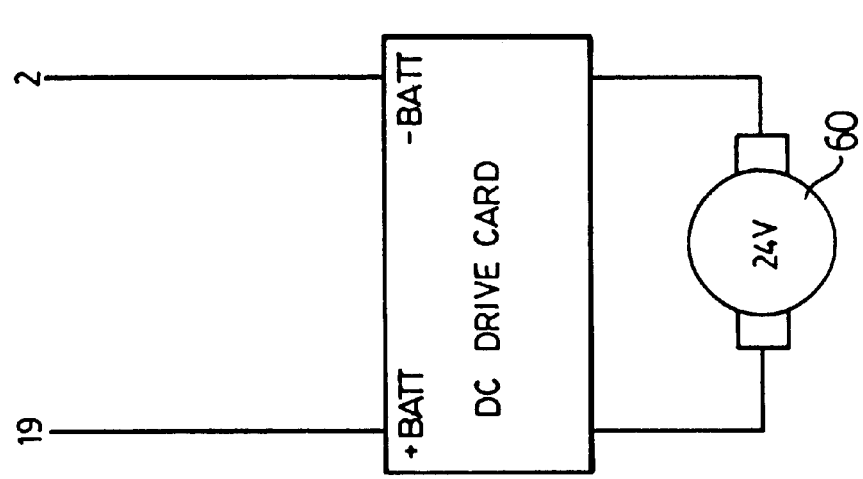

Referring to FIG. 11, the motor's speed and direction is controlled by circuitry, shown generally at 130, which adjusts the resistance across the inputs 122d, 122e and 122f, by the action of relays 132, 134 and the polarity between the inputs 122d and 122e, the latter through the actions of relay switches 136a, 136b.

Figure 12:
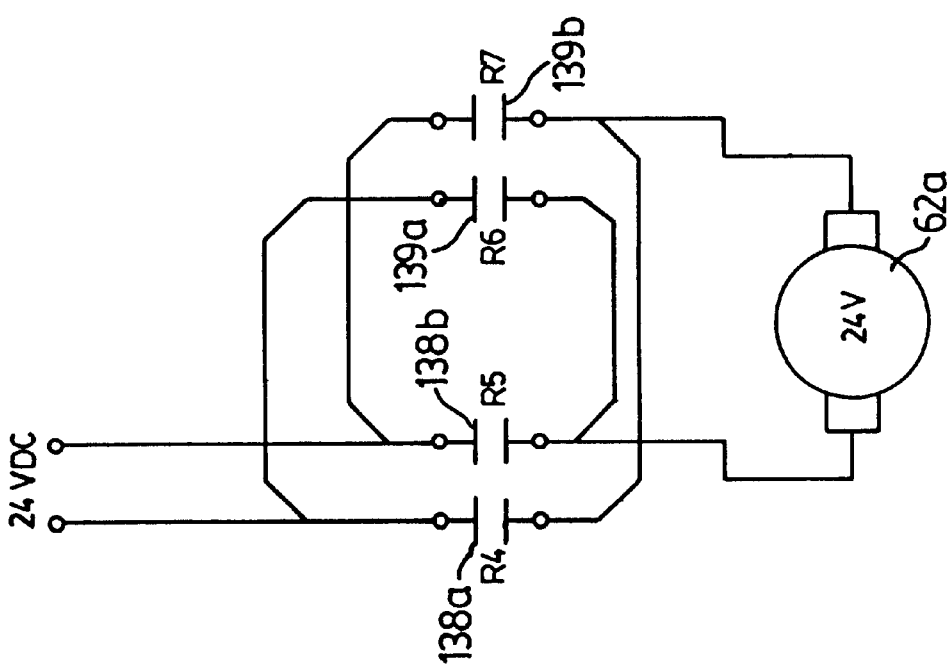

Referring to FIG. 12, the voltage is supplied to the left-right motor 62a by way of two sets of relays 138a, 138b and 139a, 139b.

Figure 10:
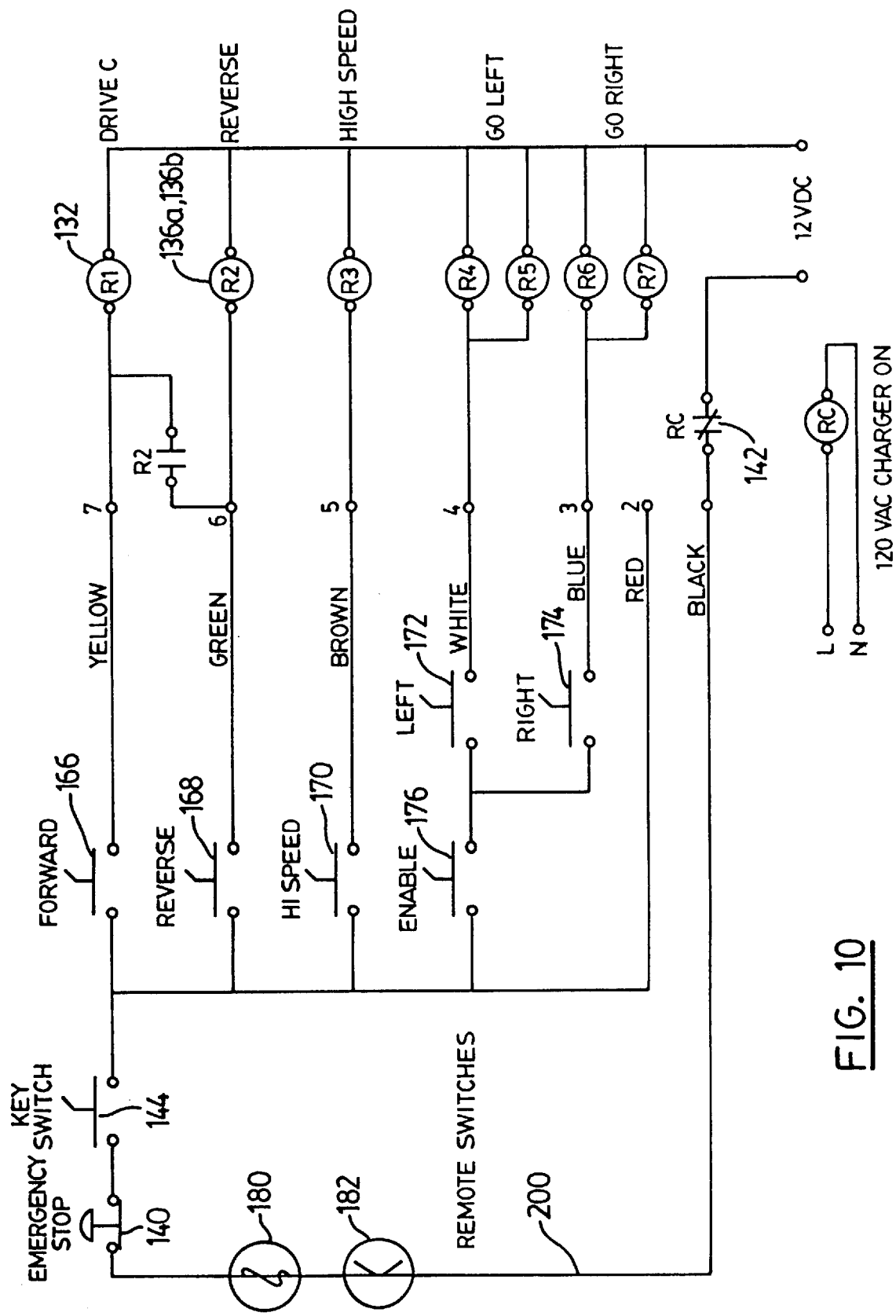

Referring to FIG. 10, the control circuitry includes an emergency stop switch 140, a battery charging-activated system interrupt switch 142 and a key switch 144, as well as two other safely switches 180 and 182 as will be described, all of which have the ability to shut down the supply voltage to the control circuitry under different situations, that is under an emergency when the operator must stop the device, when the battery charger is plugged in to a wall socket, when the device is simply shut down after a job and finally when the frame members and outriggers are not in their proper position when in use.

The control circuitry also includes forward and reverse switches 166 and 168 which control relays 132 and 136a, 136b respectively, a "hi speed" switch 170 which controls relay 134 and a combination of left, right and enable switches 172, 174 and 176 which control relays 138a, 138b and 139a, 139b.

Referring to FIG. 10, for the device 10 employing outriggers, there is provided a switch shown at 180 which is closed when the series circuit of the magnetic reed switches 112a, 112b, on each upper frame portions is also closed. In this manner, if either of the upper frame portions are not in their fully upright position, then the series circuit is broken and as a result opening the supply line 200, or otherwise shutting down the device. In addition, the switch 182 is also closed when the series circuit of four magnetic reed switches 110a to 110d at the sleeves are closed indicating that the outriggers are properly in place. Should any one of the outriggers not be in a proper position, the series circuit is broken thereby opening the supply line 200, similarly to shut down the device.

While the end frame assemblies on vehicle 10 and its variation 100 are pivoted to the base, the pivot may be made releasable, if desired, so that the end frame assemblies may be stored in another arrangement. The end frame assemblies need not necessarily be pivoted to the base. Instead, they may be provided with a pair of mating upright mounting slots on the upper surface or on the end or sides of the base to receive the end frame assemblies, or positioned on the base in some other suitable manner. While the end frame assemblies are stored adjacent the upper surfaced, they may, instead, be stored in a cavity below an upper surface, if desired. Although electric motors and actuators are used, their hydraulic and pneumatic counterparts may be preferable in some cases.

What is claimed is:

1. A mobile scaffold vehicle, comprising a motorized base with an upper surface; a first frame member and a second frame member, the first and second frame members being pivotally mounted near respective opposite ends of the upper surface, the first frame member being movable independently of the second frame member from an inoperative storage position near the upper surface and a generally vertical operative position, the second frame member being movable independently of the first frame member from an inoperative storage position near the upper surface and a generally vertical operative position, so that in their operative positions, the first and second frame members are generally parallel with one another; a platform attachable with said frame members in said operative positions and a plurality of anchor arrangements for anchoring said frame members in said operative positions, thereby to permit an operator to stand on the platform.

2. The vehicle as defined in claim 1 further comprising a pivot arrangement to pivotally couple one end of each of said frame members to the upper surface, wherein the pivot arrangements permit the frame members to nest when both frame members are in their inoperative positions.

3. The vehicle as defined in claim 2 wherein said one of said pivot arrangements is offset relative to the other of said pivot arrangements to permit the first five member to lie above the second frame member.

4. A vehicle as defined in claim 3 wherein said frame members are pivotally mounted to opposite ends of said upper surface.

5. The vehicle as defined in claim 1 wherein said second frame member in its inoperative position is spaced from said upper surface in order to receive said platform between the second frame member and said upper surface for storage.

6. The vehicle as defined in claim 1 wherein said motorized base further comprises a controller to control the motion and direction of the motorized base, a plurality of wheels; at least one of which is steerable and at least one of which is drivable under the action of the controller, the controller being positionable at the platform in order to permit an operator to operate the motorized base while standing on the platform.

7. The vehicle as defined in claim 6 wherein said base further comprises a chassis and each of said wheels is castered relative to said chassis.

8. The vehicle as defined in claim 6 wherein said motor unit drives only one of said wheels.

9. The vehicle as defined in claim 8 wherein said steering unit further comprises a linear actuator operable to displace a steering linkage to steer at least two of said wheels.

10. The vehicle as defined in claim 9 wherein the vehicle has only four wheels and said steering linkage is arranged to steer said four wheels.

11. The vehicle as defined in claim 1 wherein each of said frame members, when in its generally vertical operative position, has an upper end, the vehicle further comprising a pair of frame member extensions, each of which is independent of the other and each of which is pivotally coupled to a respective upper end each of the frame member extensions being movable between an inoperative position alongside the frame member to which it is attached and an operative upright position wherein the frame member extension is in a generally vertical position and substantially in line with the frame member to which it is attached.

12. The vehicle as defined in claim 11, wherein said frame further includes a plurality of outrigger members operable for laterally stabilizing said vehicle when each of said frame member extensions is in its operative position.

13. The vehicle as defined in claim 12, further comprising an electrical circuit arrangement operable in a first phase to detect the position of said frame members and in a second phase to disable operation of the motorized base when said frame member extensions are in their operative positions without said outrigger members in their operative positions.

14. A method of assembling a motorized scaffold comprising:

provopting a motorized base with an upper surface;

pivotally mounting a first end of each of at least two frame members to said base and near a peripheral region of the upper surface;

arranging said frame members, so that one of said frame members is movable independently of the other of the at least two frame members between an inoperative inclined position adjacent said upper surface and a generally vertical operative position;

securing said frame members in said operative position;

positioning a platform on said frame members in said operative position; and delivering a set of controls to a region above the platform to permit a scaffold operator to drive the motorize base.

15. The method as defined in claim 14 further comprising arranging said frame members to nest in said inoperative positions.

16. The method as defined in claim 14, further comprising:

pivotally coupling a frame member extension on a second end of each of said frame members; and after each frame member is in its generally vertical operative position;

pivoting each frame member extension from an inoperative position alongside the frame member to which it is attached to a generally vertical operative position wherein the frame member extension is in line with the frame member to which it is attached.

17. The method as defined in claim 16, further comprising:

providing a plurality of outrigger members on the base in a laterally outwardly extended operative position for laterally supporting the vehicle when the frame extensions are in their generally vertical operative position; and a step for providing an electrical circuit arrangement operable in a first phase to detect when the frame member extensions and the outriggers are in their operative positions and in a second phase to disable said motor unit when any one of the frame member extensions and any one of the outrigger members is not in its operative position.

18. A mobile scaffold vehicle, comprising a motorized base having an upper surface, a pair of ladder-like frame members, each frame member having a plurality of cross members and each frame member being pivotally coupled to the base near opposite ends of the upper surface, one of the frame members being movable independent of the other frame member between an inoperative inclined position adjacent said upper surface and a generally vertical upright operative position, a platform attachable with said frame members in said operative position; a pair of anchor arrangements for coupling the frame members together in their operative positions relative to the upper surface, a platform arranged to engage a selected cross member on each of the frame members and at equal elevations from the upper surface; and a control panel for operating the motorized base, said control panel being accessible from the platform.

19. A method of handling scaffolding comprising:

a step for providing a motorized base with an upper surface;

a step for mounting at least two frame members relative to said base, with each frame member near an edge region of the upper surface for movement of a first frame member independently of the second frame member between an inoperative inclined position adjacent said upper surface and a generally vertical operative position and movement of the second frame member independently of the first frame member between an inoperative inclined position adjacent said upper surface and a generally vertical operative position;

a step for securing said frame members in their generally vertical operative positions; and a step for positioning a platform on said frame members in their generally vertical operative positions.

* * * * *